United States Patent
Cho (10) Patent No.: US 7,840,223 B2
(45) Date of Patent: Nov. 23, 2010

(54) PORTABLE TELEPHONE, IMAGE CONVERTER, CONTROL METHOD AND PROGRAM

(75) Inventor: Hironari Cho, Osaka (JP)

(73) Assignee: Kyocera Corporation, Kyoto (JP)

(*) Notice: Subject to any disclaimer, the term of this patent is extended or adjusted under 35 U.S.C. 154(b) by 389 days.

(21) Appl. No.: 11/578,802

(22) PCT Filed: Apr. 26, 2005

(86) PCT No.: PCT/JP2005/007862

§ 371 (c)(1),
(2), (4) Date: Sep. 8, 2008

(87) PCT Pub. No.: WO2005/106970

PCT Pub. Date: Nov. 10, 2005

(65) Prior Publication Data

US 2009/0305718 A1   Dec. 10, 2009

(30) Foreign Application Priority Data

Apr. 28, 2004   (JP) ............................. 2004-134511

(51) Int. Cl.
*H04W 24/00* (2009.01)
(52) U.S. Cl. .................. 455/456.1; 455/550; 455/466; 382/167; 382/181
(58) Field of Classification Search ............. 455/456.1, 455/466, 550.1; 382/167, 181
See application file for complete search history.

(56) References Cited

U.S. PATENT DOCUMENTS

| | | |
|---|---|---|
| 4,366,507 A | 12/1982 | Mori |
| 4,524,447 A | 6/1985 | Willis et al. |
| 6,822,759 B1 * | 11/2004 | Konishi et al. ............... 358/1.9 |
| 7,505,782 B2 * | 3/2009 | Chu ........................ 455/550.1 |

FOREIGN PATENT DOCUMENTS

| | | |
|---|---|---|
| EP | 0 812 102 B1 | 12/1997 |
| JP | 56-100572 | 8/1981 |

(Continued)

OTHER PUBLICATIONS

Japanese Office Action from JP Patent Application No. 2004-134511, mailed on Jan. 5, 2010.

*Primary Examiner*—David Q Nguyen
(74) *Attorney, Agent, or Firm*—Morrison & Foerster LLP (57) ABSTRACT

Simple pseudo gradation conversion technique suitable for implementation in portable devices such as mobile phones employing a relatively low-speed processor. Target image is represented with $2^{Cn}$ gradation levels for n kinds of color components (where Cn is a natural number for each color component, and n is a natural number) per pixel. Image information acquisition unit (51) acquires image information representing an original image subjected to conversion from camera front end (40) and modulation/demodulation unit (61). Color space conversion unit 55 converts luminance color difference information, if the original image is represented thereby, into color component information. Quantization unit (54) quantizes the color component information into $(2^{(Cn+1)}-1)$ gradation values for each color component. Color determination unit (56) determines one-half of the quantized value as a target value, if the quantized value is an even number, and if an even number, one of the two integers preceding and following that half value is determined as a target value according to a pixel position so that those integers are arranged checkerwise.

30 Claims, 2 Drawing Sheets

FOREIGN PATENT DOCUMENTS

| | | |
|---|---|---|
| JP | 60-5691 | 1/1985 |
| JP | 6-125462 | 5/1994 |
| JP | 6-250621 | 9/1994 |
| JP | 8-018781 | 1/1996 |
| JP | 10-75376 | 3/1998 |

* cited by examiner

PORTABLE TELEPHONE, IMAGE CONVERTER, CONTROL METHOD AND PROGRAM

TECHNICAL FIELD

The present invention relates to image conversion devices for obtaining a target image that is represented using pseudo gradation based on an original image, and in particular to image converting techniques suitable for implementation in portable devices such as mobile phones for which a relatively low-speed processor is employed.

BACKGROUND ART

There have been remarkable developments in the functionality incorporated in the mobile phones. And mobile phones equipped with various functions such as a camera function and an image display function that uses a liquid crystal display of an excellent color resolution, in addition to the arrangement for the basic function to call are provided.

One of the mobile phones currently under development is capable of displaying images at 65536 ($2^{16}$) color resolution that are taken by using the camera function or that are acquired by means of communications.

In the case of a display at the 65536 color resolution, color data is represented by 16 bits. Such data is processed using a processor capable of performing arithmetic operations on a 16-bit basis and then is transferred via a 16-bit bus with most preferable efficiency.

Regardless of that high 65536 color resolution, there are certain images that cannot be displayed properly.

Examples for this are images of a wall or blue sky whose colors change very little, and hence, color unevenness is caused due to Mach band effects, resulting in the failure to attain a preferable image quality in terms of visual perception. In fact, a demand is heard from users for avoiding such color unevenness.

As an approach for improving the image quality, it can be suggested that an image is displayed as a rendition using the pseudo gradation based on the 65536 colors that can actually be displayed.

The pseudo gradation is a well-known technique in which pixels contained in a certain area of an image are broken down into small groups and are colored in multiple ways so that intermediate-level colors that are not actually displayed can be perceived in a pseudo way by an observer who is looking from a distance.

This pseudo gradation method is roughly divided into two categories, a dither method and a random dither method. A detailed description will be found in the non-patent literature 1, Chapter 8 "Image Gradation Conversion Method."

If the number of colors that are represented in the pseudo way is increased using the pseudo gradation, it is expected that the color unevenness can be reduced or avoided while the efficiency in transferring image data remains a preferable level.

Conventional techniques introducing the most fundamental arrangements for realizing the pseudo gradation using the dither method are disclosed in the patent publications 1 and 2.

Patent publication 1: Japanese unexamined patent publication No. 6-125462

Patent publication 2: Japanese unexamined patent publication No. 6-250621

Non-patent literature 1: A Guide to Digital Image Processing, written by Hitoshi Kishi, published by CQ Publishing Company in 2002, 9th edition.

DISCLOSURE OF THE INVENTION

The Problems to be Solved by the Invention

When the above-described conventional techniques are employed, there arises a problem that in order to obtain an image that is represented by the pseudo gradation, real number computation is performed while a dither value array is referenced, resulting in the extremely large number of operation processes required, and hence, a target image cannot be displayed within a practical time if the relevant processes are performed in software using a relatively low-speed processor that is employed in portable devices such as mobile phones.

In the case of the random dither method, this problem becomes more significant, because more operation processes are required to execute error propagation to adjacent pixels.

In view of the above problems, the present invention is intended to provide a simple technique for image conversion that is adaptable for use in portable devices such as mobile phones, and mobile phones using the same.

Means to Solve the Problems

In order to solve the above-mentioned problems, the present invention provides an image conversion device for obtaining, based on an original image composed of multiple pixels, a target image composed of the same number of pixels as that of the original image and is represented by pseudo gradation. The device includes: where colors assigned to the pixels in the target image are represented with $2^{Cn}$ gradation levels for each of n kinds of color components (Cn is a natural number for each color component, and n is a natural number), a quantization unit operable to quantize each color component for the original image with ($2^{(Cn+1)}-1$) gradation values; and a color determination unit operable, for each pixel on a basis of the correspondence of the pixels in the original image to the pixels in the target image, to divide by two each of a quantized value resulting from the quantization or the quantized value plus one, in accordance with the position of each pixel, so as to obtain each quotient, and to set that quotient for each color component red, green, and blue, respectively.

Effects of the Invention

With the above-described arrangement of the present invention, those colors assigned to the pixels in the target image can be determined using bit shift operations and integer operation only, and therefore, it can be realized in a more simple way than those conventional techniques employing the real number computation that is carried out while dither values are referenced.

Thanks to this simplicity, where the arrangement of the present invention is applied to portable devices such as mobile phones for which relatively low-speed processor is used, the above-mentioned target image can be displayed within a practical time using such a processor.

In comparison with the case where the pseudo gradation is not adopted, the target image is displayed with approximately two times of the gradation levels for each color component and eight times thereof in total, in a pseudo way. As a result, the Mach band effects can be reduced to such an extent as to be imperceptible to an observer.

The arrangement in accordance with the present invention is so simple that applications to DSP and ASIC are facilitated.

In addition, since information pertinent to other pixels is not used for the processing of a specific pixel, degradation of image quality due to the moir effect or noise addition that is inherent in the random dither method is not caused.

Also, it is feasible that the colors assigned to the pixels in the target image are represented with $2^5$, $2^6$, and $2^5$ gradation levels for each color component red, green, and blue, respectively, and the quantization unit obtains quantized values $R_q$, $G_q$, and $B_q$ using the following formulae in the order of appearance, assuming that the colors assigned to the pixels in original image are represented by eight-bit values $R_8$, $G_8$, and $B_8$ for the color components red, green, and blue, respectively:

$$((R_8 << 6) - R_8) >> 8$$

$$((G_8 << 7) - G_8) >> 8$$

$$((B_8 << 6) - B_8) >> 8,$$

where, << represents a left-shift operation, and >> represents a right-shift operation. And the color determination unit obtains five-bit value $R_5$, six-bit value $G_6$, and five-bit value $B_5$ for red, green, and blue, respectively, of the pixels in the target image on the basis of the correspondence of the pixels, using the following formulae in the order of appearance, assuming that X and Y represent X and Y coordinate values, respectively, that indicate the position of each pixel:

$$(R_q + ((X+Y) \& 0x01)) >> 1$$

$$(G_q + ((X+Y) \& 0x01)) >> 1$$

$$(B_q + ((x+Y) \& 0x01)) >> 1,$$

where, >> represents the right-bit shift operation, and & a logical product.

The quantization unit may include a color space conversion unit operable to obtain the color component values $R_8$, $G_8$, and $B_8$ for the color components red, green, and blue, respectively, using the following formulae in the order of appearance, assuming that colors assigned to the pixels in the original image are represented by Y, U, and V, which denote brightness, and two color differences, and U−128 is $U_0$, and V−128 is $V_0$:

$$Y + ((V_0 * 357) >> 8)$$

$$Y - ((U_0 * 87) >> 8) - ((V_0 * 182) >> 8)$$

$$Y + ((U_0 * 451) >> 8),$$

where, >> represents the right shift operation. From the $R_8$, $G_8$, and $B_8$ values, the quantization unit then obtains those quantized values $R_5$, $G_6$, and $B_5$, respectively.

With these arrangements of the present invention, the number of colors that can be actually displayed is $2^{15}$ (65536), which is most suitable for data transfer using a 16-bit bus that is most widely used in the industry. Since two colors that are adjacent to each other within the $2^{15}$ colors are arranged in a checkerboard pattern so as to compose an intermediate color, it is hardly possible for the observer to recognize that a pseudo colored portion is represented by two colors, if the target image is displayed on a screen whose resolution is 72 dpi (dot per inch) or higher. In this case, the color gradation levels of $2^{19}$ (approximately 520,000 colors) are displayed in the pseudo way, and hence, the Mach band effects are reduced to such an extent as to be imperceptible to the observer.

In order to solve the above-mentioned problems, a mobile phone of the present invention is equipped with an image display function, and includes: an image acquisition unit operable to acquire an original image; the image conversion device set forth in any one of claims 1 to 3 for obtaining the target image based on the original image acquired; and a display unit operable to display the target image.

It is also feasible that the mobile phone further includes an image capture unit, and from that unit, the image acquisition unit acquires the original image.

In the above-described mobile phone, the image conversion device is connected to the display unit using a bus for transferring data on a 16-bit basis, and the bus transfers the 16-bit data formed by sequencing the color component values for one pixel that are obtained by the image conversion device.

When a relevant target image is displayed on a mobile phone with these arrangements implemented therein, the same effects as described above can be achieved.

In order to solve the above-mentioned problems, a method of the present invention is an image conversion method for obtaining, based on an original image composed of multiple pixels, a target image composed of the same number of pixels as that of the original image and is represented by pseudo gradation. The method includes the steps of: where colors assigned to the pixels in the target image are represented with $2^{Cn}$ gradation levels for each of n kinds of color components (Cn is a natural number for each color component, and n is a natural number), quantizing each color component from the original image into $(2^{(Cn+1)}-1)$ gradation values; and for each pixel on the basis of the correspondence of the pixels in the original image to the pixels in the target image, determining each color assigned to the pixels in the target image by dividing by two each of a quantized value resulting from the quantization or the quantized value plus one, in accordance with the position of each pixel, so as to obtain each quotient, and setting that quotient for each color component for the pixels in the target image.

It is also feasible that the colors of the pixels in the target image are represented with $2^5$, $2^6$, and $2^5$ gradation levels for each color component red, green, and blue, respectively, and the quantization step obtains quantized values $R_q$, $G_q$, and $B_q$, using the following formulae in the order of appearance, assuming that colors assigned to the pixels in the original image are represented by eight-bit values $R_8$, $G_8$, and $B_8$ for the color components red, green, and blue, respectively:

$$((R_8 << 6) - R_8) >> 8$$

$$((G_8 << 7) - G_8) >> 8$$

$$((B_8 << 6) - B8) >> 8,$$

where, << represents the left-bit shift operation, and >> the right-bit shift operation, and the color determination step obtains five-bit value $R_5$, six-bit value $G_6$, and five-bit value $B_5$ for red, green, and blue, respectively, of the pixels in the target image on the basis of the correspondence of the pixels, using the following formulae in the order of appearance:

$$(R_q + ((X+Y) \& 0x01)) >> 1$$

$$(G_q + ((X+Y) \& 0x01)) >> 1$$

$$(B_q + ((X+Y) \& 0x01)) >> 1,$$

where >> represents the right-bit shift operation, and & the logical product.

Furthermore, it is also feasible that the quantization step includes a substep of converting a color space by obtaining the color component values $R_8$, $G_8$, and $B_8$ for the color components red, green, and blue, respectively, using the following formulae in the order of appearance, assuming that the colors of the pixels in the original image are represented by Y, U, and V, which denote brightness, and two color differences, and U−128 is $U_0$, and V−128 is $V_0$:

$$Y+((V_0*357)>>8)$$

$$Y-((U_0*87)>>8)-((V0*182)>>8)$$

$$Y+((U_0*451)>>8),$$

where >> represents the right-bit shift operation. Then based on the values obtained in the color space conversion substep, the quantization unit obtains the quantized values $R_5$, $G_6$, and $B_5$.

By executing the image conversion processing following these methods, the same effects as described above can be achieved.

In order to solve the above-mentioned problems, a method of the present invention is a control method for use in a mobile phone equipped with an image display function, and includes the steps of: acquiring an original image; converting the original image acquired into a target image using the image conversion method set forth in any one of claims 7 to 9; and displaying the target image.

It is also feasible that the mobile phone may include an image capture function, and using that function, the image acquisition step acquires the original image.

Furthermore, it is feasible that the mobile phone includes a display device that is connected to a bus for transferring data on a 16-bit basis, the image conversion step generates image data with which the target image is represented on the basis of 16 bits per pixel, using the image conversion method set forth in claim 8 or claim 9, and the control method further includes a step of transferring the image data to the display device on the 16 bits per pixel via the bus, and the display step displays the target image that is represented by the image data transferred.

By executing the image display on a mobile phone following these methods, the same effects as described above can be achieved.

In order to solve the above-mentioned problems, a computer program of the present invention is a computer executable program for enabling the computer to execute each step described above.

In order to solve the above-mentioned problems, by controlling the mobile phone so as to execute the image conversion, the same effects as described above can be achieved.

EXPLANATION OF REFERENCES

1 Mobile phone
10 Antenna
20 Radio communication unit
30 Camera unit
40 Camera front end unit
50 Integrated modem unit
51 Image acquisition unit
52 JPEG decoding unit
53 Image conversion unit
54 Quantization unit
55 Color space conversion block
56 Color determination unit
57 Display control unit
61 Modulation/Demodulation unit
62 Communication control unit
63 Audio processing unit
70 Display unit
81 Receiver
82 Microphone

BEST MODE FOR CARRYING OUT THE INVENTION

An embodiment of the present invention will hereinafter be explained with reference to the accompanying drawings.

An image conversion device in accordance with the present invention is included in a mobile phone, and generates a target image that is represented with pseudo gradation based on an original image that is taken by a camera embedded in the phone or is acquired through communications by executing simple processing.

The implementation of such a mobile phone reduces color unevenness due to the Mach band effects to such an extent as to be imperceptible to an observer.

<Overall Configuration>

Figure 1:
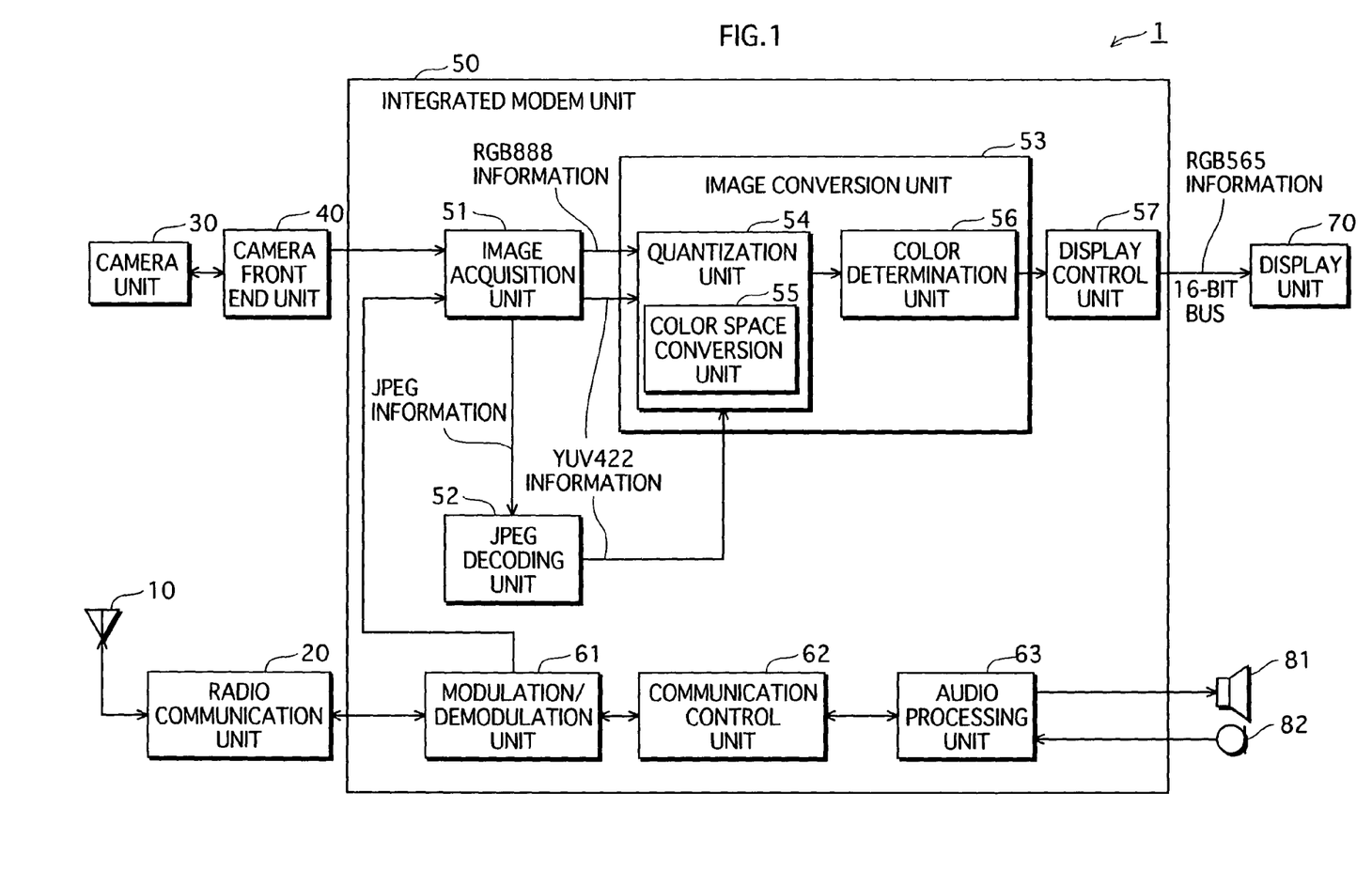
FIG. 1 is a functional block diagram illustrating an overall configuration of a mobile phone in accordance with the present invention.

FIG. 1 is a functional block diagram showing the overall configuration of a mobile phone 1. The mobile phone 1 includes: an antenna 10; a radio communication unit 20; a camera unit 30; a camera front end unit 40; an integrated modem unit 50; a display unit 70; a receiver 81; and a microphone 82.

The integrated modem unit 50 includes: an image information acquisition unit 51; a JPEG decoding unit 52; an image conversion unit 53; a display unit 54; a color space conversion unit 55; and a color determination unit 56. The image conversion unit 53 includes: a quantization unit 54; a color space conversion unit 55; and a color determination unit 56.

The image conversion unit 53 in the integrated modem unit 50 is equivalent to an image conversion device in accordance with an embodiment of the present invention.

The integrated modem unit 50 may be realized using an integrated circuit device used for a modem that includes CPU (Central Processing Unit) and DSP (Digital Signal Processor). In this case, each unit in the modem unit 50 corresponds to a program module that is executed by the CPU and DSP so as to perform each function assigned thereto.

The radio communication unit 20 amplifies a reception signal received by the antenna 10, and then the modulation/demodulation unit 61 demodulates the reception signal into a control signal and a reception information signal. The control signal is used for controlling the communication in accordance with a communications technology called CDMA (Code Division Multiple Access), TDMA (Time Division Multiple Access) or the like that is employed for the mobile phone 1. The communication control unit 62 controls communication timing based on the control signal, and the audio processing unit 63 converts the reception information signal into an audio signal so as to be outputted from the receiver 82.

The audio processing unit 63 converts the audio signal received from the microphone 82 into a transmission information signal. Under the control of the communication control unit 62, the modulation/demodulation unit 61 modulates the transmission information signal into a transmission signal, and the radio communication unit 20 amplifies the transmission signal so as to transmit that signal through the antenna 10.

It should be noted that the reception information signal may alternatively represent an image other than a conversational voice. Such an image is, for example, formatted in JPEG (Joint Picture Expert Group) and is acquired from a Website or as a document attached to an e-mail message. The reception information signal representing an image is outputted to the image information acquisition unit 51 through the modulation/demodulation unit 61.

The camera unit 30 is a solid-state imaging element of a CCD (Charge Coupled Device) type or a MOS (Metal Oxide Semiconductor) type, and takes an image under the control of the camera front end unit 40 regarding light exposure and outputting of a signal. The camera front end unit 40 is realized by an ASIC (Application Specific Integrated Circuit) and outputs image information representing a taken image to the image information acquisition unit 51.

The image information is represented using a color component format and a luminance color difference format. In the image information in the color component format, for example, each color component of red, green, and blue is represented by eight bits for each pixel. Such information is named RGB888 information. In the case of the image information in the luminance color difference format, for example, luminance for each pixel and two color differences for every two pixels are represented by eight bits. Such information is named YUV422 information.

In the case where the camera front end unit 40 includes a JPEG encoding circuit, image information represented in the JPEG format can also be obtained. Such image information is named JPEG information.

It is also feasible to process image information that is represented in a format named YUV4:4:4 in which a color difference is indicated for each pixel, or YUV4:2:0 in which a color difference is indicated for every four pixels.

The image information acquisition unit 51 acquires image information in the color component format, luminance color difference format, or JPEG format from the modulation/demodulation unit 61 and camera front end unit 40. The JPEG decoding unit 52 is fed with the JPEG information from the image information acquisition unit 51, and outputs to the image conversion unit 53 YUV422 information that is converted from the JPEG information.

The color space conversion unit 55 converts the YUV422 information to the RGB888 information.

The quantization unit 54 quantizes an eight-bit value for each color component that is represented by the RGB888 information, given from the image information acquisition unit 51 or obtained by the color space conversion unit 55, into the number of gradation levels obtained by doubling the gradation levels actually used for a display and subtracting one from the resulting value thereby. For example, in the case where a color actually displayed is represented by 5 bits, 6 bits, and 5 bits for red, green, and blue, respectively, in other words, in the case where each color component is represented with $2^5$ (32), $2^6$ (64), and $2^5$ (32) gradation levels, values for the color components represented by the RGB information are quantized into 63, 127, and 63 gradation values, respectively.

Using the quantized values for each color component obtained by the above-described quantization method, the color determination unit 56 calculates target values for representing colors of the pixels in the target image that correspond to those of the original image, and then outputs those values to the display control unit 57. Specifically, if the quantized values are even numbers, half of each quantized value is designated as the target value. If the quantized values are odd numbers, two integers preceding and following the half of each value are alternately taken by pixels adjacent to each other. In other words, one of two integers is assigned as the target value in accordance with the position of a relevant pixel, in such a manner that those integers are arranged in a checkerboard pattern.

The display control unit 57 generates the RGB565 information that is represented by 16 bits per pixel by sequencing the target values for red, green, and blue fed by the color determination unit 56, and transmits the RGB565 information to the display unit 70 on a pixel basis via the 16-bit bus.

The display unit 70 then displays an image represented by the RGB565 information.

<Image Conversion Processing>

Figure 2:
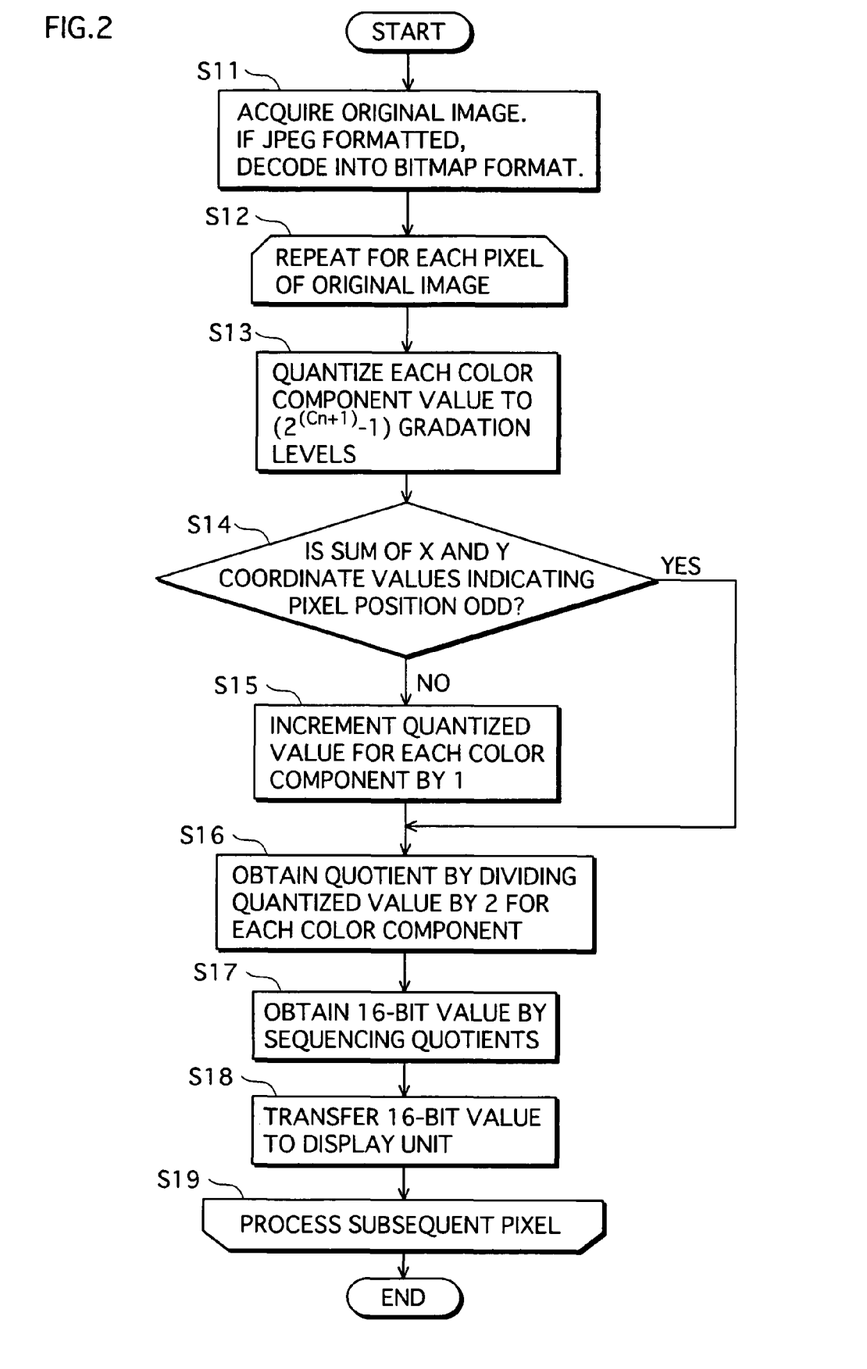
FIG. 2 is a flowchart depicting an example of an image conversion process.

FIG. 2 is a flowchart depicting in detail a process executed by the integrated modem unit 50.

The image information acquisition unit 51 acquires from the modulation/demodulation unit 61 or camera front end unit 40 image information representing an original image. If the image information is JPEG-formatted, the JPEG decoding unit 52 converts this information to the YUV422 information. This conversion is carried out by using a well-known technique for converting image information of the JPEG format into luminance color difference information for each pixel (step S11).

The image conversion unit 53 acquires the RGB888 information or YUV422 information representing an original image from the image information acquisition unit 51 or JPEG decoding unit 52, and calculates the above-mentioned target values for the color components for each pixel (step S12 through step S19).

The color space conversion unit 55 calculates the values $R_8$, $G_8$, and $B_8$ for red, green, and blue, respectively, of the RGB888 information, using the following formulae, if the original image is represented by the YUV422 information, assuming that luminance, and two color differences of the YUV422 information is denoted by Y, U, and V, respectively, $$U_0 = U - 128$$

$$V_0 = V - 128$$

$$R_8 = Y + ((V_0 * 357) >> 8)$$

$$G_8 = Y - ((U_0 * 87) >> 8) - ((V_0 * 182) >> 8)$$

$$B_8 = Y + ((U_0 * 451) >> 8),$$

where = represents an assignment operation, >> the right-bit shift operation. For this calculation, the same value may be used for U and V every two pixels. Alternatively, a value obtained by interpolating multiple adjacent Us and Vs may be used.

Using the following formulae in the order of appearance, the quantization unit 54 obtains the quantized values $R_q$, $G_q$, and $B_q$ that are quantized into 63, 127, and 63 gradation values, respectively, from $R_8$, $G_8$, and $R_8$, for red, green, and blue of the RGB888 information that is given by the image information acquisition unit 51 or is obtained by the color space conversion unit 55.

$$R_q = R_8 * 63/256$$

$$G_q = G_8 * 127/256$$

$$B_q = B_8 * 63/256,$$

where = represents an assignment operation. For this calculation, it is assumed, as described above, that the actually displayed colors are represented with $2^5$, $2^6$, and $2^5$ gradation levels for red, green, and blue, respectively. Specifically, it is also feasible that these values are obtained using the following formulae in the order of appearance for which the bit-shift operation is adopted (step S13).

$$R_q=((R_8<<6)-R_8)>>8$$

$$G_q=((G_8<<7)-G_8)>>8$$

$$B_q=((B_8<<6)-B_8)>>8,$$

where = represents an assignment operation, << represents the left-bit shift operation, and >> the right-bit shift operation.

Only if the sum of an X coordinate value and a Y coordinate value is an odd number (YES in step S14), the color determination unit 56 increments those quantized values $R_q$, $G_q$, and $B_q$ by 1 (step S15). Then the resulting values are divided by two so as to obtain quotients expressed by integers, and those integers are determined to be the target values $R_5$, $G_6$, and $B_5$. Specifically, it is also feasible that these values are obtained using the following formulae, assuming that X and Y represent X and Y coordinate values, respectively, that indicate the position of a relevant pixel of an image subject to the processing.

$$R_5=(R_q+((X+Y)\&0x01))>>1$$

$$G_6=(G_q+((X+Y)\&0x01))>>1$$

$$B_5=(B_q+((X+Y)\&0x01))>>1,$$

where = represents the assignment operation, & represents a logical product, >> the right-bit shift operation (S16). For this calculation, it should be determined, in terms of the original intention of the quantized values, whether a relevant quantized value is an odd or even number, and then if the relevant value is an odd number, it should be incremented by 1. It is, however, noted that regardless of this odd/even determination, a desired result can be achieved by incrementing the value by 1. Accordingly, this determination process is skipped so as to reduce the amount of computation.

For the sake of convenience, a pixel whose X+Y results in an odd number is called an odd pixel, while a pixel whose X+Y results in an even number is called an even pixel.

The display control unit 57 obtains 16-bit data by sequencing the target values $R_5$, $G_6$, and $B_5$ that are obtained by the color determination unit 56, and outputs that data to the display unit 70 through the 16-bit bus.

Then the display unit 70 displays the target image that is represented by the target values $R_5$, $G_6$, and $B_5$ received from the display control unit through the bus.

Apart from the above-described methods, another method is available, in which arrays used in the conversion are prepared in advance and are referenced so as to obtain the target values, and based on those values, the 16-bit data is produced. A detailed description will be provided on this method using program codes described in the C language.

Arrays used in the conversion are prepared as follows:

Two-dimensional arrays t5[2] [768], t6[2] [768] are secured. t5[0] [ ] is related to the target values for red and blue assigned to the odd pixels, t5[1] [ ] is related to the target values for red and blue assigned to the even pixels. t6[0] [ ] is related to the target values for green assigned to the even pixels, while t6[1] [ ] is to the target values for green to the odd pixels.

The following values are assigned to array elements in which a two-dimensional index i takes 0 to 255.

t5[0][i]=0x00 t5[1][i]=0x00 t6[0][i]=0x00 t6[1][i]=0x00

The target values for an odd pixel and even pixel that correspond to values (i−256) for the color components of the RGB888 information are assigned to the array elements in which i takes 256 to 511. Specifically, assuming that the quantized values ((i<<6)−i)>>8 for the 63 gradation levels and ((i<<7)−i)>>8 for the 127 gradation levels that correspond to (i−256) are c5 and c6, respectively, t5[0][i]=c5>>1 t5[1][i]=(c5+1)>>1 t6[0][i]=c6>>1 t6[1][i]=(c6+1)>>1

The following values are assigned to the array elements in which i takes 512 to 767.

t5[0][i]=0x1F t5[1][i]=0x1F t6[0][i]=0x3F t6[1][i]=0x3F

Furthermore, arrays *T5[2], *T6[2] are secured so as to point to head addresses of the respective arrays for the odd pixels and even pixels that are referenced in the course of processing thereof, and the following addresses are assigned to each element.

T5[0]=&t5[0][256]

T5[1]=&t5[1][256]

T6[0]=&t6[0][256]

T6[1]=&t6[1][256]

Through the above-described processes, those arrays used in the conversion are prepared. This processing is carried out once prior to pixel-based loop processing.

Subsequent to the preparation of the arrays, in the case of the original image represented by the YUV422 information, that information is converted into the RGB888 information using the above-described operations.

After that, the array elements each corresponding to the values $R_8$, $G_8$, and $B_8$ for red, green, and blue of the RGB888 information are referenced so as to obtain the target values, and then the 16-bid data, RGB16 is obtained by sequencing those target values. Specifically, a value for determining whether a relevant pixel is an odd pixel or even pixel is obtained in the first place, using the following formula:

$$t\_ix=(X+Y)\&0x01.$$

With reference to the resulting value, the RGB16 is obtained using the following formula:

$$RGB16=(*(T5[t\_ix]+R8)<<11)|(*T6([t\_ix]+G8)<<5)*(T5[t\_ix]+B8).$$

Through the above-described processes, the target value for one pixel is obtained. This processing is carried out for each pixel.

<Summary>

As clarified above, in the image conversion devices and methods of the present invention, the target values are obtained by performing the bit-shift operations, logical product, and integer addition/subtraction based on the original RGB values, and hence, they can be realized in a more simple manner compared with the conventional techniques employing the reference to the dither values and the real number operation. Furthermore, in accordance with the present invention, the number of colors that are actually displayed is $2^{16}$ (65536), which is most suitable for the data transfer using the 16-bit bus that is widely used in the industry.

Therefore, if image conversion devices and/or image conversion methods in accordance with the present invention are applied to portable devices such as mobile phones in which a relatively low-speed processor is used, it is made possible to display the target images within sufficiently practical time.

Since a display operation is carried out in approximately $2^{19}$ (approximately 520,000) gradation colors, the Mach band effects can be reduced as much as imperceptible to an observer.

Thanks to the simplicity of the processing in accordance with the present invention, the adaptation for the DSP and ASIC is facilitated.

In addition, since information pertinent to other pixels is not required when a specific pixel undergoes the processing, the degradation of the image quality due to the moir effect inherent in the random dither method and noise addition is not caused. Moreover, since adjacent two colors of the $2^{16}$ (65536) are arranged in the checkerboard pattern so as to obtain an intermediate color, the observer can hardly recognize the fact that a pseudo colored portion is represented in two colors, if the target image is displayed on a screen of 72 dpi (dot per inch) or higher resolution.

OTHER EXAMPLES OF MODIFICATIONS

The present invention has been explained in detail in the above embodiment. However, the present invention is not limited to this, and other modifications described below can be included within the scope of the invention.

Although it is explained in the description of the embodiment that the image conversion processing is carried out by the integrated modem unit 50, this processing may be left to the camera front end unit 40. Mobile phones in which the camera front end 40 is arranged so as to carry out the image conversion are included within the scope of the present invention. The present invention may be realized in the form of a digital signal, by which a computer program is implemented.

Also, the present invention may be realized in the form of a recording medium where the computer program or digital signal is stored in a computer-readable manner, such as flexible disks, hard disc, CD, MO, DVD, BD, or semiconductor memory.

Moreover, the present invention may be realized in the form of the computer program or digital signal that is transported via an electric communication line, wireless or wired communication line, or a network such as the Internet.

Furthermore, the computer program or digital signal may be transferred to an independent mobile phone while being stored in the recording medium or may be transferred via the network to the mobile phone so as to implement it therein.

INDUSTRIAL APPLICABILITY

The present invention is suitable for portable devices such as mobile phones that are equipped with a relatively low-speed CPU.

The invention claimed is:

1. An image conversion device for obtaining, based on an original image composed of a plurality of pixels, a target image composed of a same number of pixels as that of the original image and is represented by pseudo gradation, where for colors assigned to the pixels in the target image, each of n kinds of color components is represented with $2^{Cn}$ gradation levels, the n being a natural number, and the Cn being a natural number for each of the color components, the image conversion device comprising:

a quantization unit operable to quantize each of the color components for the original image into $2^{(Cn+1)}-1$ gradation values; and a color determination unit operable, for each of the pixels on a basis of a correspondence of the pixels in the original image to the pixels in the target image, to divide by two each of a quantized value resulting from the quantization and the quantized value plus one, in accordance with a position of each of the pixels, so as to obtain each quotient, and to set the quotient for each of the color components for the pixels in the target image.

2. The image conversion device of claim 1, wherein for the colors assigned to the pixels in the target image, each of the color components red, green, and blue are represented with $2^5$, $2^6$, and $2^5$ gradation levels, respectively;

the quantization unit obtains quantized values $R_q$, $G_q$, and $B_q$ using formulae (i) in an order of appearance, assuming that the colors of the pixels in the target image are represented by eight-bit values $R_8$, $G_8$, and $B_8$ for the color components red, green, and blue, respectively, $$((R_8 \ll 6) - R_8) \gg 8$$

$$((G_8 \ll 7) - G_8) \gg 8$$

$$((B_8 \ll 6) - B_8) \gg 8, \qquad (i)$$

where $\ll$ represents a left-bit shift operation, $\gg$ represents a right-bit shift operation; and the color determination unit obtains five-bit value $R_5$, six-bit value $G_6$, and five-bit value $B_5$ for red, green, and blue, respectively, of the pixels in the target image on the basis of the correspondence of the pixels, using a formula (ii), assuming that X and Y represent X and Y coordinate values, respectively, that indicate the position of each of the pixels, $$(R_q + ((X+Y) \& 0x01)) \gg 1$$

$$(G_q + ((X+Y) \& 0x01)) \gg 1$$

$$(B_q + ((X+Y) \& 0x01)) \gg 1, \qquad (ii)$$

where $\gg$ represents the right-bit shift operation, and & a logical product.

3. The image conversion device of claim 2, wherein the quantization unit includes a color space conversion unit operable to obtain the color component values $R_8$, $G_8$, and $B_8$ for the color components red, green, and blue, respectively, using formulae (iii) in the order of appearance, assuming that colors assigned to the pixels in the original image are represented by Y, U, and V, which denote brightness, and two color differences, and U−128 is $U_0$, and V−128 is $V_0$, $$Y+((V_0*357)>>8)$$

$$Y-((U_0*87)>>8)-((V_0*182)>>8)$$

$$Y+((U_0*451)>>8), \quad \text{(iii)}$$

where >> represents the right-bit shift operation, and
from the $R_8$, $G_8$, and $B_8$ values, the quantization unit obtains the quantized values $R_5$, $G_6$, and $B_5$, respectively.

4. A mobile phone capable of displaying an image, comprising:
an image acquisition unit operable to acquire an original image;
the image conversion device of claim 1 for obtaining the target image based on the original image; and
a display unit operable to display the target image.

5. The mobile phone of claim 4, further comprising:
an image capture unit, from which the image acquisition unit acquires the original image.

6. The mobile phone of claim 4, wherein
the image conversion device is connected to the display unit using a bus for transferring data on a 16-bit basis, and the bus transfers the 16-bit data formed by sequencing the color component values for one pixel that are obtained by the image conversion device.

7. An image conversion method for obtaining, based on an original image composed of a plurality of pixels, a target image composed of a same number of pixels as that of the original image and is represented by pseudo gradation, wherein
for colors assigned to the pixels in the target image, each of n kinds of color components is represented with $2^{Cn}$ gradation levels, the Cn being a natural number for each of the color components, and the n being a natural number,
the image conversion method comprising the steps of:
quantizing each of the color components for the original image into $2^{(Cn+1)}-1$ gradation values; and
for each of the pixels on a basis of a correspondence of the pixels in the original image to the pixels in the target image, determining, by a processing unit, each of the colors assigned to the pixels in the target image by dividing by two each of a quantized value resulting from the quantization and the quantized value plus one, in accordance with a position of each of the pixels, so as to obtain each quotient, and setting the quotient for each of the color components for the pixels in the target image.

8. The image conversion method of claim 7, wherein
for the colors of the pixels in the target image, each of the color components red, green, and blue is represented with $2^5$, $2^6$, and $2^5$ gradation levels, respectively,
the quantization step obtains quantized values $R_q$, $G_q$, and $B_q$ using formulae (iv) in an order of appearance, assuming that colors assigned to the pixels in the original image are represented by eight-bit values $R_8$, $G_8$, and $B_8$ for the color components red, green, and blue, respectively, $$((R_8<<6)-R_8)>>8$$

$$((G_8<<7)-G_8)>>8$$

$$((B_8<<6)-B_8)>>8, \quad \text{(iv)}$$

where << represents a left-bit shift operation, and >> represents a right-bit shift operation; and
the color determination step obtains five-bit value $R_5$, six-bit value $G_6$, and five-bit value $B_5$ for red, green, and blue, respectively, of the pixels in the target image on the basis of the correspondence of the pixels, using formulae (v) in the order of appearance, $$(R_q+((X+Y)\&0x01))>>1$$

$$(G_q+((X+Y)\&0x01))>>1$$

$$(B_q+((X+Y)\&0x01))>>1, \quad \text{(v)}$$

where >> represents the right-bit shift operation, and & the logical product.

9. The image conversion method of claim 8, wherein
the quantization step includes a substep of converting a color space by obtaining the color component values $R_8$, $G_8$, and $B_8$ for the color components red, green, and blue, respectively, using formulae (vi) in the order of appearance, assuming that the colors of the pixels in the original image are represented by Y, U, and V, which denote brightness, and two color differences, and U−128 is $U_0$, and V−128 is $V_0$, $$Y+((V_0*357)>>8)$$

$$Y-((U_0*87)>>8)-((V_0*182)>>8)$$

$$Y+((U_0*451)>>8), \quad \text{(vi)}$$

where >> represents the right-bit shift operation.

10. A control method for use in a mobile phone equipped with an image display function, comprising the steps of:
acquiring an original image;
converting the original image acquired into a target image using the image conversion method set forth in claim 7; and
displaying the target image.

11. The control method of claim 10, wherein
the mobile phone includes an image capture function, and using the image capture function, the image acquisition step acquires the original image.

12. The control method of claim 10, wherein
the mobile phone includes a display device that is connected to a bus for transferring data on a 16-bit basis,
the image conversion step generates, using the image conversion method, image data with which the target image is represented on a basis of 16 bits per pixel,
the control method further comprises a step of
transferring the image data to the display device on the basis of 16 bits per pixel via the bus, and
the display step displays the target image that is represented by the image data transferred.

13. A computer-readable medium storing instructions thereon for, when executed by a processor, converting an image, the instructions enabling the computer to execute each of the steps set forth in claim 7.

14. A computer-readable medium storing instructions thereon for, when executed by a processor, controlling a mobile phone equipped with an image display function, the instructions enabling the computer to execute each of the steps set forth in claim 10.

15. A mobile phone capable of displaying an image, comprising:
an image acquisition unit operable to acquire an original image;
the image conversion device of claim 2 for obtaining the target image based on the original image; and
a display unit operable to display the target image.

16. A mobile phone capable of displaying an image, comprising:
   an image acquisition unit operable to acquire an original image;
   the image conversion device of claim 3 for obtaining the target image based on the original image; and
   a display unit operable to display the target image.

17. The mobile phone of claim 15, further comprising:
   an image capture unit, from which the image acquisition unit acquires the original image.

18. The mobile phone of claim 16, further comprising:
   an image capture unit, from which the image acquisition unit acquires the original image.

19. The mobile phone of claim 15, wherein
   the image conversion device is connected to the display unit using a bus for transferring data on a 16-bit basis, and
   the bus transfers the 16-bit data formed by sequencing the color component values for one pixel that are obtained by the image conversion device.

20. The mobile phone of claim 16, wherein
   the image conversion device is connected to the display unit using a bus for transferring data on a 16-bit basis, and
   the bus transfers the 16-bit data formed by sequencing the color component values for one pixel that are obtained by the image conversion device.

21. A control method for use in a mobile phone equipped with an image display function, comprising the steps of:
   acquiring an original image;
   converting the original image acquired into a target image using the image conversion method set forth in claim 8; and
   displaying the target image.

22. A control method for use in a mobile phone equipped with an image display function, comprising the steps of:
   acquiring an original image;
   converting the original image acquired into a target image using the image conversion method set forth in claim 9; and
   displaying the target image.

23. The control method of claim 21, wherein
   the mobile phone includes an image capture function, and using the image capture function, the image acquisition step acquires the original image.

24. The control method of claim 22, wherein
   the mobile phone includes an image capture function, and using the image capture function, the image acquisition step acquires the original image.

25. The control method of claim 21, wherein
   the mobile phone includes a display device that is connected to a bus for transferring data on a 16-bit basis,
   the image conversion step generates, using the image conversion method, image data with which the target image is represented on a basis of 16 bits per pixel,
   the control method further comprises a step of
   transferring the image data to the display device on the basis of 16 bits per pixel via the bus, and
   the display step displays the target image that is represented by the image data transferred.

26. The control method of claim 22, wherein
   the mobile phone includes a display device that is connected to a bus for transferring data on a 16-bit basis,
   the image conversion step generates, using the image conversion method, image data with which the target image is represented on a basis of 16 bits per pixel,
   the control method further comprises a step of
   transferring the image data to the display device on the basis of 16 bits per pixel via the bus, and
   the display step displays the target image that is represented by the image data transferred.

27. A computer-readable medium storing instructions thereon for, when executed by a processor, converting an image, the instructions enabling the computer to execute each of the steps set forth in claim 8.

28. A computer-readable medium storing instructions thereon for, when executed by a processor, converting an image, the instructions enabling the computer to execute each of the steps set forth in claim 9.

29. A computer-readable medium storing instructions thereon for, when executed by a processor, controlling a mobile phone equipped with an image display function, the instructions enabling the computer to execute each of the steps set forth in claim 21.

30. A computer-readable medium storing instructions thereon for, when executed by a processor, controlling a mobile phone equipped with an image display function, the instructions enabling the computer to execute each of the steps set forth in claim 22.

* * * * *